United States Patent
Friedl et al.

(10) Patent No.: US 11,781,692 B2
(45) Date of Patent: Oct. 10, 2023

(54) ADAPTOR WITH QUICK CONNECT COUPLING

(71) Applicant: A. Raymond et Cie, Grenoble (FR)

(72) Inventors: Julien Friedl, Ruederbach (FR); Jurgen Trimpin, Efringen-Kichen (DE)

(73) Assignee: A. RAYMOND ET CIE, Grenoble (FR)

(*) Notice: Subject to any disclaimer, the term of this patent is extended or adjusted under 35 U.S.C. 154(b) by 97 days.

(21) Appl. No.: 17/157,159

(22) Filed: Jan. 25, 2021

(65) Prior Publication Data
US 2021/0270402 A1 Sep. 2, 2021

(30) Foreign Application Priority Data
Feb. 28, 2020 (EP) .................................... 20290026

(51) Int. Cl.
*F16L 37/12* (2006.01)
*B05B 15/65* (2018.01)

(52) U.S. Cl.
CPC ........... *F16L 37/1225* (2013.01); *B05B 15/65* (2018.02)

(58) Field of Classification Search
CPC ............... F16L 37/1225; F16L 37/0841; F16L 37/0885; F16L 37/088; F16L 39/00; F16L 39/06; F16L 39/04; F16L 39/005; F16L 39/09
USPC ...... 285/84, 20, 19, 33, 120.1, 121.1, 121.3, 285/121.6, 122.1, 124.1, 124.3, 124.4, 285/319, 307
See application file for complete search history.

(56) References Cited

U.S. PATENT DOCUMENTS

| | | | |
|---|---|---|---|
| 4,611,831 A | 9/1986 | Truchet | |
| 5,201,552 A | 4/1993 | Hohmann et al. | |
| 5,219,185 A | 6/1993 | Oddenino | |
| 5,507,529 A | 4/1996 | Martins | |
| 5,556,137 A | 9/1996 | Ream | |
| 5,556,138 A | 9/1996 | Nakajima et al. | |
| 6,682,100 B2 | 1/2004 | Wood et al. | |
| 7,604,258 B2 | 10/2009 | Getto et al. | |
| 7,976,071 B2 | 7/2011 | Bibby | |
| 8,430,365 B2 | 4/2013 | Benoit et al. | |
| 8,678,446 B2 | 3/2014 | Nakamura | |
| 8,864,179 B2* | 10/2014 | Kitagawa ................ | F16L 37/36 285/124.3 |
| 10,024,552 B2 | 7/2018 | Adey et al. | |
| 10,047,889 B2 | 8/2018 | Chaupin et al. | |
| 10,164,373 B1 | 12/2018 | Cheon et al. | |

(Continued)

FOREIGN PATENT DOCUMENTS

| | | |
|---|---|---|
| CN | 105090641 A | 11/2015 |
| DE | 20011475 | 9/2000 |
| EP | 2095002 | 9/2009 |

*Primary Examiner* — Aaron M Dunwoody
(74) *Attorney, Agent, or Firm* — Warner Norcross + Judd LLP

(57) ABSTRACT

The present disclosure provides an adaptor with a quick connect coupling for joining a flow control valve, or other device, with a source of fluid media. The adaptor includes a female connector configured to receive a male connector and a locking member slidable in a transverse direction to lock the connectors together. The adaptor can handle multiple fluid media, and accordingly includes a plurality of inlets and a plurality of outlets for the passage of fluid media through the adaptor. Vehicles and systems incorporating the adaptor are also disclosed.

14 Claims, 11 Drawing Sheets

(56) References Cited

U.S. PATENT DOCUMENTS

| | | |
|---|---|---|
| 2003/0197369 A1 | 10/2003 | Fukano et al. |
| 2004/0124631 A1* | 7/2004 | Kardeis .............. A61B 17/1622 |
| | | 285/124.1 |
| 2017/0146173 A1 | 5/2017 | Chaupin et al. |
| 2019/0234547 A1 | 8/2019 | Gauthier |

* cited by examiner

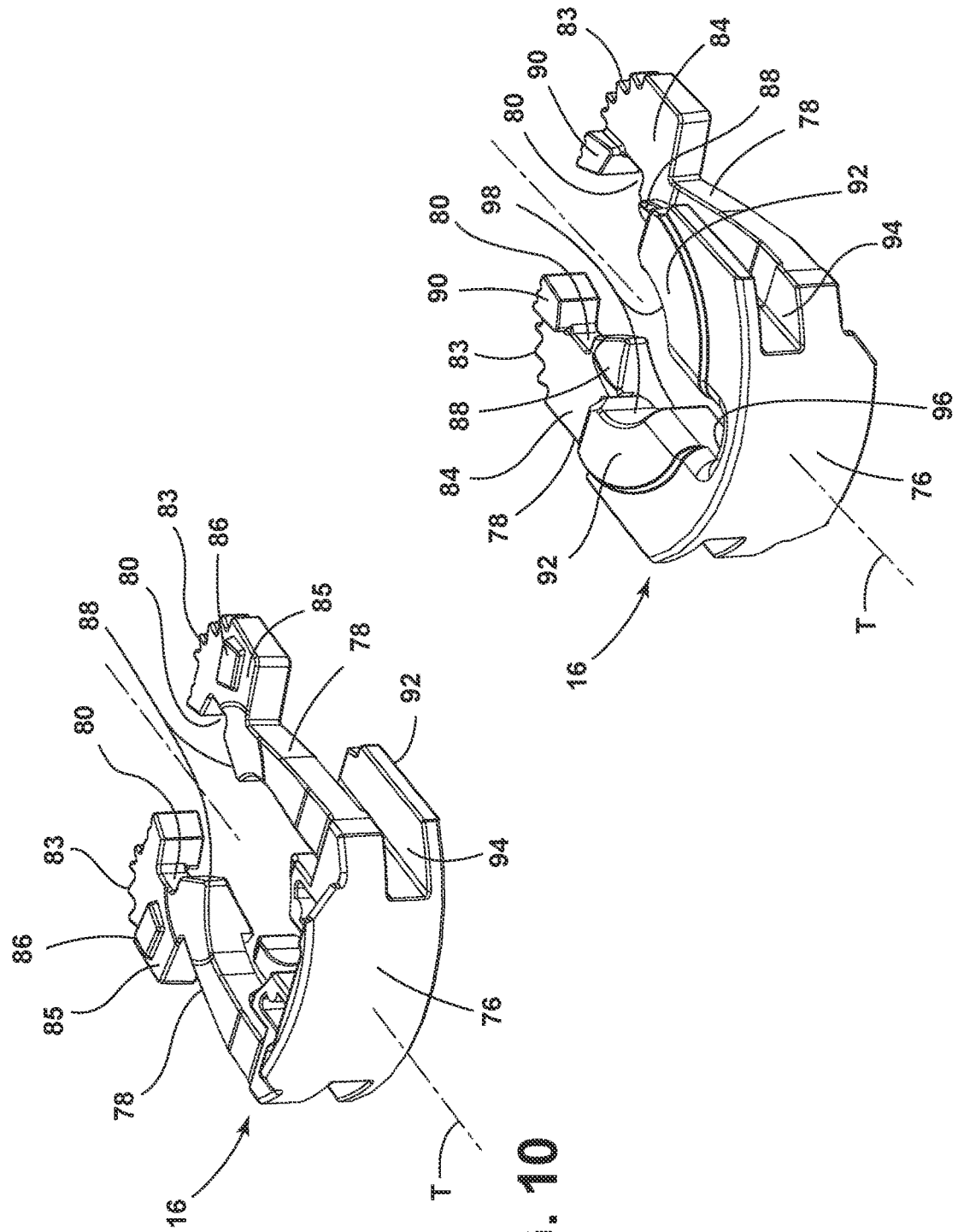

ADAPTOR WITH QUICK CONNECT COUPLING

CROSS-REFERENCE TO RELATED APPLICATIONS

This application claims priority to and all advantages of European Application No. 20290026.2, filed on 28 Feb. 2020, which is incorporated by reference herein.

FIELD OF THE INVENTION

The present disclosure generally relates to adaptors for connecting flow control valves or other devices to a supply of fluid media, e.g. for cleaning a surface, such as a vehicle camera, sensor, or other surface, and, more specifically to adaptors with quick connect couplings.

DESCRIPTION OF THE RELATED ART

Adaptors for connecting fluid handling devices, such as conduits, valves, hoses, tubes, etc., to a supply of fluid media to establish a continuous flow path therebetween are known to use quick connect couplings. For example, in automotive applications, quick connectors are used in various fluid media delivery systems, such as cleaning systems including a nozzle for delivering cleaning media to a vehicle surface. Said nozzles can be used to clean exterior cameras and driver assistance sensors, as well as windows, headlights, and other vehicle surfaces. Quick connect couplings are capable of quickly and simply connecting the components of these systems to one another.

Many adaptors can handle one fluid media, e.g. water or air, limiting the usefulness of the adaptor across different fluid line architectures. Such conventional designs are also bulky and heavy. Numerous quick connect couplings are required to make the necessary connections to establish continuous flow paths throughout the system. In newer automotive designs requiring a greater number of cameras and sensors, such as for self-driving or autonomous vehicles, space and weight constraints make conventional adaptors and quick connect couplings undesirable and impractical.

SUMMARY OF THE INVENTION

An improved adaptor with a quick connect coupling is provided. The adaptor includes a female connector having a body defining a recess and an orifice into which a male connector is to be inserted along an axial direction, a locking member that extends along a transverse direction in the recess of the female connector and is slidable in the transverse direction to lock the female and male connectors together and prevent removal of the male connector from the female connector, a first adaptor inlet configured for fluid communication with a first source of fluid media, a second adaptor inlet configured for fluid communication with a second source of fluid media, a first adaptor outlet in fluid communication with the first adaptor inlet, the first adaptor outlet disposed on one side of the body of the female connector, and a second adaptor outlet in fluid communication with the second adaptor inlet, the second adaptor outlet disposed on an opposing side of the body of the female connector.

An assembly comprising the adaptor is also provided. The assembly includes a flow control valve comprising a male connector, a first valve inlet disposed on one side of the male connector, and a second valve inlet disposed on an opposing side of the male connector. The first adaptor outlet is coupled with the first valve inlet, and the second adaptor outlet coupled with the second valve inlet.

These and other features and advantages of the present disclosure will become apparent from the following description of particular embodiments, when viewed in accordance with the accompanying drawings and appended claims.

DESCRIPTION OF THE DRAWINGS

In the drawings:

FIG. 10 is a front, top perspective view of the locking member;

FIG. 11 is a front, bottom perspective view of the locking member;

DETAILED DESCRIPTION OF THE INVENTION

An improved adaptor with a quick connect coupling is provided. As will be appreciated from the description here, the quick connect adaptor has multiple applications, but is generally used as a device for quickly connecting a flow control valve to a supply of fluid media, or to multiple supplies of fluid media. It is to be understood that the adaptor may be used to couple other devices with one or more supply of fluid media, such as hoses, tubing, pipes, and the like. The adaptor can handle different types of fluid media, including liquids and/or air. In some applications, the adaptor can be provided as part of a system with a nozzle for cleaning a vehicle surface and a flow control valve supplying a cleaning media, or multiple cleaning media, to the nozzle. Non-vehicle applications are also contemplated.

The terms "fluid media" and "cleaning media" encompass fluid substances that are capable of flowing, including liquid, air, and mixtures thereof. The term "air" encompasses air and any other gas or mixtures of gasses, unless otherwise noted.

Referring generally to the Figures, wherein like numerals indicate corresponding parts throughout the several views, one embodiment of the quick connect adaptor is illustrated and generally designated at 10. Certain features of the adaptor 10 are functional, but can be implemented in different aesthetic configurations.

Figure 1:
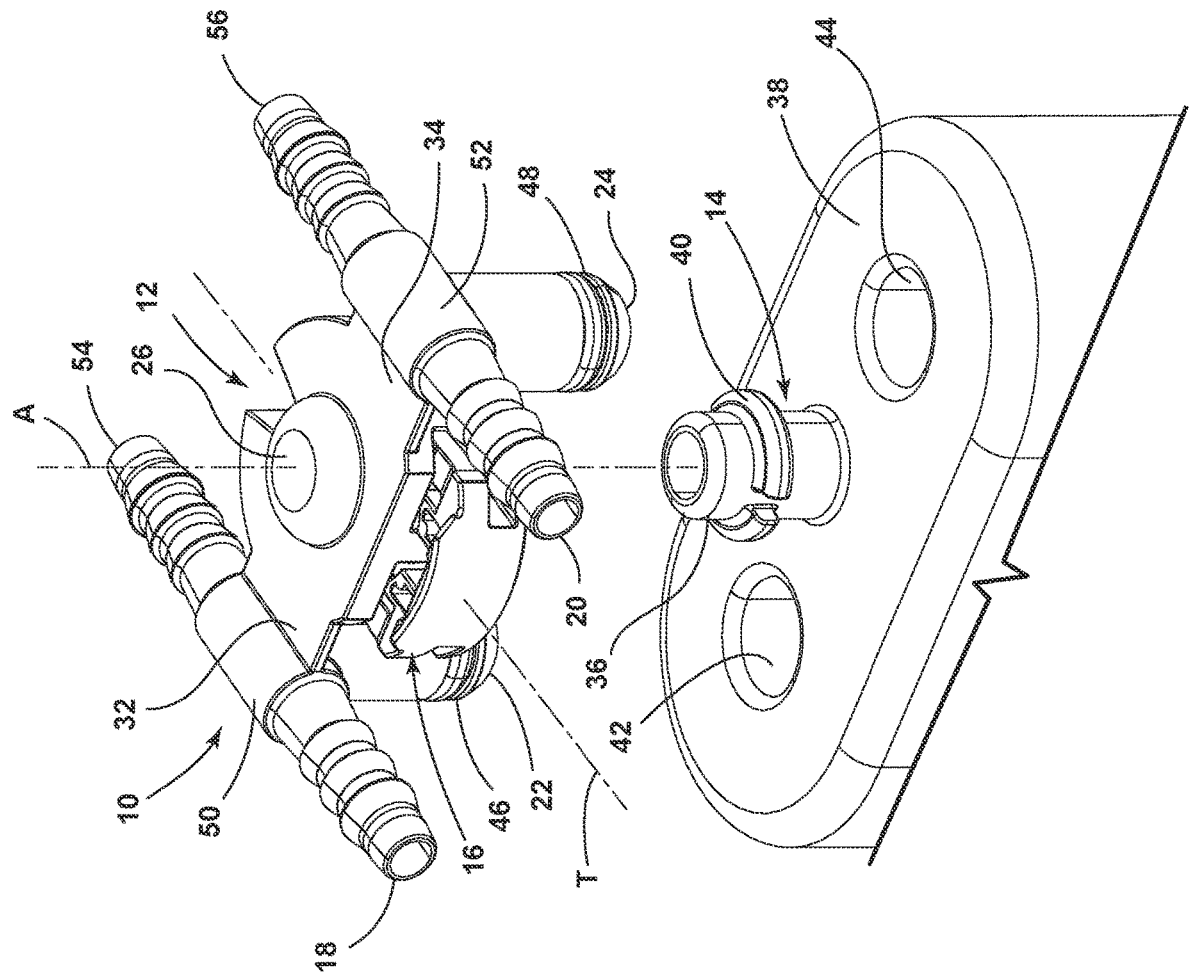
FIG. 1 is an exploded view of an adaptor with a quick connect coupling which, in this embodiment, comprises a female connector configured to receive a male connector along an axial direction and a locking member slidable in a transverse direction to lock the female and male connectors together.
Figure 2:
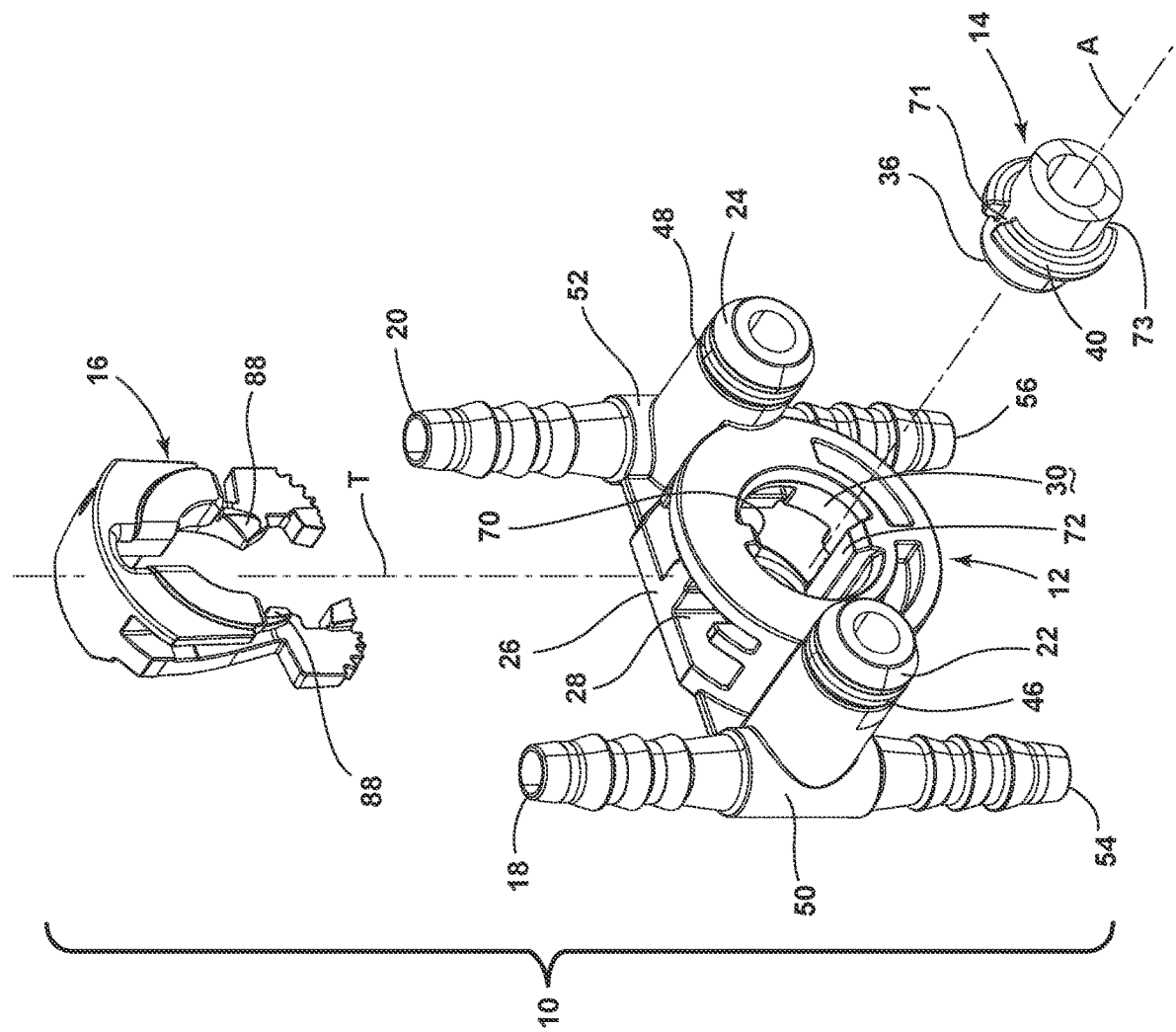
FIG. 2 is another exploded view of the adaptor of FIG. 1, showing the locking member positioned for insertion into the female connector along the transverse direction and a portion of the male connector positioned for insertion into the female connector along the axial direction.

In FIGS. 1-2, the quick connect adaptor 10 includes a female connector 12 configured to receive a male connector 14, a locking member 16 slidable in a transverse direction to lock the female and male connectors 12, 14 together and prevent removal of the male connector 14 from the female connector 12, and a plurality of inlets 18, 20 and outlets 22, 24 for the passage of fluid media through the adaptor 10.

The female connector 12 can have a body 26 defining a recess 28 and an orifice 30 into which the male connector 14 can be inserted along an axial direction A. The locking member 16 can extend along a transverse direction T in the recess 28 of the female connector 12. Thus, a single, central quick connect coupling can secure the adaptor 10 to the male connector 14.

In one embodiment, the inlets 18, 20 and outlets 22, 24 can be offset from the female connector 12. That is, fluid media does not flow through the female connector 12. This permits the adaptor 10 to handle multiple fluid media. The orifice 30 of the female connector 12 can be non-coaxial with the adaptor inlets 18, 20 and adaptor outlets 22, 24, such that the connection with the male connector 14 is separate from the fluid connections.

The adaptor inlets 18, 20 and adaptor outlets 22, 24 can be integrally formed with the female connector 12, such that the female connector 12, inlets 18, 20, and outlets 22, 24 are a one-piece part manufactured, for example, via molding or an additive manufacturing process, e.g. a 3-D printing process. The locking member 16 can be formed separately, and inserted into the recess 28 of the female connector 12 along the transverse direction T. The female connector 12 and locking member 16 can be manufactured from plastic material, e.g. by injection molding or additive manufacturing.

The multiple inlets 18, 20 can include at least a first adaptor inlet 18 configured for fluid communication with a first source of fluid media and a second adaptor inlet 20 configured for fluid communication with a second source of fluid media.

The multiple outlets 22, 24 can include at least a first adaptor outlet 22 in fluid communication with the first adaptor inlet 18 and a second adaptor outlet 24 in fluid communication with the second adaptor inlet 20.

The first adaptor outlet 22 can be disposed on one side 32 of the body 26 of the female connector 12, also referred to herein as a first side 32 of the body 26. The second adaptor outlet 24 disposed on an opposing side 34 of the body 26 of the female connector 12, also referred to herein as a second side 34 of the body 26. Optionally, where the adaptor body 26 is generally circular or cylindrical, the first adaptor outlet 22 can be diametrically opposite the second adaptor outlet 24.

The male connector 14 can comprise a tubular protrusion 36, optionally from a valve 38 (only of portions of which are shown in FIGS. 1-2), configured to be axially inserted into the female connector 12, i.e. along the axial direction A. The male connector 14 can include an annular collar 40 on the periphery of the tubular protrusion 36. The valve 38 can further comprise multiple inlets 42, 44, and the adaptor outlets 22, 24 can be adapted to mate with the valve inlets 42, 44 to couple the valve 38 to a source, or sources, of fluid media, as described in further detail below.

In one embodiment, the adaptor 10 can be configured to handle different types of fluid media, including liquids, air, or other gases. This may be helpful when the valve 38 is a dual flow control valve for controlling dual flows of pressurized fluid media. For example, the first adaptor inlet 18 can be configured for fluid communication with a first source of fluid media, such as liquid, and the second adaptor inlet 20 can be configured for fluid communication with a second source of fluid media, such as air. The sources of fluid media may be pressurized, as in the case of vehicular cleaning systems.

The male connector 14 can be inserted axially into the female connector 12, and the locking member 16 can slide in the transverse direction T to lock the connectors 12, 14 together and prevent removal of the male connector 14 from the female connector 12, e.g. prevent decoupling of the valve 38 from the adaptor 10. In one embodiment, the locking member 16 is configured to interfere mechanically with the collar 40 of the male connector 14 as the male connector 14 is being inserted into the female connector 12 (e.g., FIGS. 3-4), and to move by itself in the transverse direction T toward a locked or connection position (e.g., FIGS. 5-6) as the female connector 12 is pushed onto the male connector 14. In other words, the locking member 16 is moved via the insertion of the male connector 14, and not by a user exerting external force directly on the locking member 16. The mechanical interference between the collar 40 and the female connector 12 as the male connector 14 is pushed into the female connector 12, or as the female connector 12 is pushed onto the male connector 14, draws the locking member 16 into the locked or connection position, as described in further detail below.

One or both of the adaptor outlets 22, 24 can be orthogonal to the transverse direction T. Put another way, one or both of the adaptor outlets 22, 24 can be parallel to the axial direction A. As the male connector 14 is inserted axially into the female connector 12, a connection can also be established between the adaptor outlets 22, 24 and valve inlets 42, 44.

As shown in the figures, the adaptor outlets 22, 24 can comprise male fittings that are inserted axially into the valve inlets 42, 44, which can comprise female receptacles for the male fittings. The valve inlets 42, 44 can be configured to accept the adaptor outlets 22, 24 to establish a fluid connection between sources of fluid media and the valve 38, via the adaptor 10. The male fittings 22, 24, can depend from the body 26 of the female connector 12, such that they can be inserted into female receptacles 42, 44 along the axial direction A. With the male fittings 22, 24 depending from the body 26, the body 26 can abut the valve 38 when the male connector 14 is fully pushed into the female connector 12 (e.g., FIG. 5). In another embodiment, the adaptor outlets 22, 24 can comprise female receptacles, with the valve inlets 42, 44 comprising male fittings.

Sealing elements 46, 48 can be provided at the interfaces between the adaptor outlets 22, 24 and the valve inlets 42, 44 to prevent leakage of fluid media at the interfaces. In illustrative embodiment, the sealing elements 46, 48 are O-rings carried on the adaptor outlets 22, 24.

One or both of the adaptor inlets 18, 20 can be orthogonal to its corresponding adaptor outlet 22, 24. Where one or both of the adaptor outlets 22, 24 are orthogonal to the transverse direction T, one or both of the adaptor inlets 18, 20 can be parallel to the transverse direction T.

As shown in the figures, the adaptor inlets 18, 20 can comprise barbed tubes adapted for engaging an end of a hose (not shown), such as those commonly used for the delivery of fluid media to a valve. The opposite end of the hose is connected to a fluid media source (not shown). Hoses can be pre-assembled with the adaptor inlets 18, 20 prior to connection with the valve 38, and the orthogonal relationship between the adaptor inlets 18, 20 and adaptor outlets 22, 24 can keep the hoses out of the way during assembly of the adaptor 10 with the valve 38. It is understood that while barbed tubes are shown herein, the adaptor inlets 18, 20 can be otherwise configured for fluid communication with a source of cleaning media.

The adaptor 10 can include passages between the inlets 18, 20 and their respective outlets 22, 24. The passages can include at least a first passage 50 between the first adaptor inlet 18 and the first adaptor outlet 22 and a second passage 52 between the second adaptor inlet 20 and the second adaptor outlet 24. In one embodiment, the inlets 18, 20 are non-coaxial with the associated outlet 22, 24, and the passages 50, 52 include at least one bend to change the flow direction of the fluid media passing from the inlet 18, 20 to the associated outlet 22, 24.

In some embodiments, the adaptor 10 can comprise a manifold, with the passages 50, 52 branching into more than one outlet. Optionally, the adaptor 10 can include a first bypass 54 extending from the first passage 50 for conducting fluid media, such as liquid, around the first adaptor outlet 22 (i.e. bypassing the valve 38) and a second bypass 56 extending from the second passage 52 for conducting fluid media, such as air, around the second adaptor outlet 24 (i.e. bypassing the valve 38).

The bypasses 54, 56 can optionally provide fluid media to another downstream adaptor 10, or other flow control valve, such as in a "daisy chain" system where multiple valves are fed from a common source of fluid media. In other embodiments of the adaptor 10 where a daisy chain system is not required, the bypasses 54, 56 may not be included.

As shown in the figures, the bypasses 54, 56 can comprise barbed tubes adapted for engaging an end of a hose (not shown), such as those commonly used for the delivery of fluid media. The opposite end of the hose can be connected to another adaptor or flow control valve. Hoses can be pre-assembled with the bypasses 54, 56 prior to connection with the valve 38, and the orthogonal relationship between the bypasses 54, 56 and adaptor outlets 22, 24 can keep the hoses out of the way during assembly of the adaptor 10 with the valve 38. It is understood that while barbed tubes are shown herein, the bypasses 54, 56 can be otherwise configured for fluid communication with a downstream adaptor, valve, or other device.

The bypasses 54, 56 can be coaxial with the associated adaptor inlet 18, 20. The coaxial, opposing relationship between the bypasses 54, 56 and the adaptor inlets 18, 20 reduces tangling of any hoses coupled thereto. In other embodiments, the bypasses 54, 56 can be non-coaxial with the associated adaptor inlet 18, 20.

Figure 9:
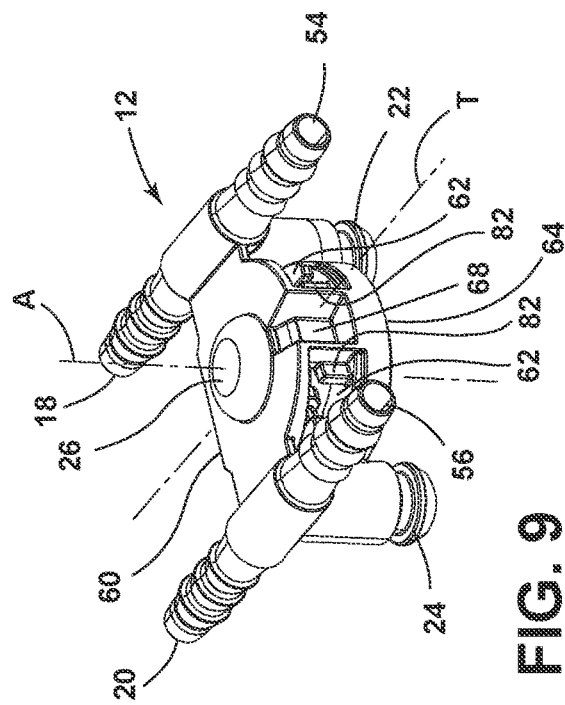
FIG. 9 is a rear, top perspective view of the female connector.
Figure 7:
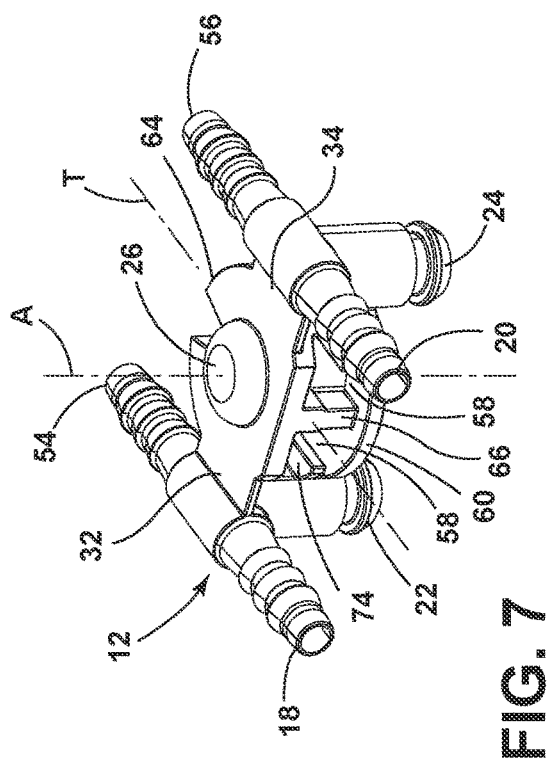
FIG. 7 is a front, top perspective view of the female connector.
Figure 8:
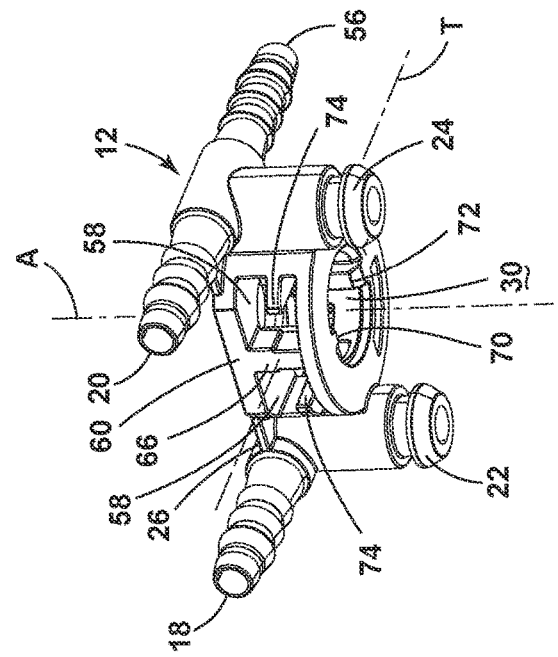
FIG. 8 is a front, bottom perspective view of the female connector.

Referring to FIGS. 7-9, the adaptor body 26 can include one or more radial openings forming the recess 28 of the female connector 12. In the embodiment, shown. two through holes 58 are formed on one side 60 of the body 26, also referred to herein as a front side 60 of the body 26, and two through holes 62 on a second side 64 of the body 26, also referred to herein as a rear side 64 of the body 26. A first partition 66 separates the first or front through holes 60. A second partition 68 separates the second or rear through holes 62. The partitions 66, 68 improve the rigidity of the adaptor body 26.

Locking ribs 70, 72 run axially along inwardly-facing portions of the partitions 66, 68. The locking ribs 70, 72 are received in corresponding slots 71, 73 (FIG. 2) in the annular collar 40 of the male connector 14 to radially align the female and male connectors 12, 14 during assembly, and prevent radial displacement (i.e. twisting) between the female and male connectors 12, 14 once assembled.

The first or front through holes 58 can define a channel into which the locking member 16 can be inserted transversely and slide radially, i.e. along the transverse direction T. Slides 74 can be elongated along the transverse direction T and can extend inwardly toward each other in a direction generally orthogonal to the transverse direction T, e.g. to face the inside of the orifice 30 of the female connector 12.

Figure 3:
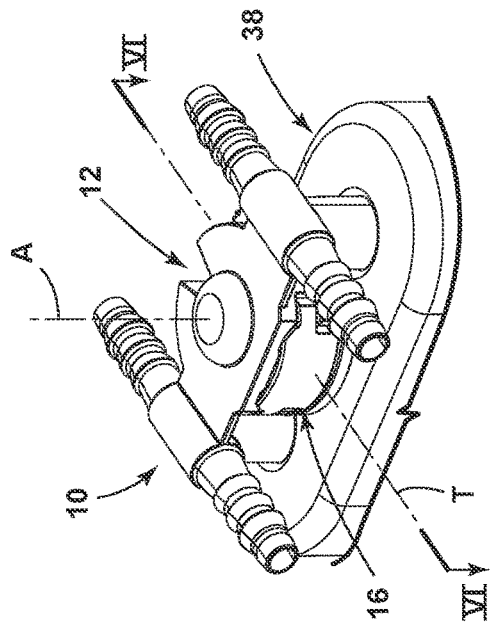
FIG. 3 is a perspective view of the adaptor with the locking member in a pre-connection position, showing the male connector being inserted into the female connector.
Figure 5:
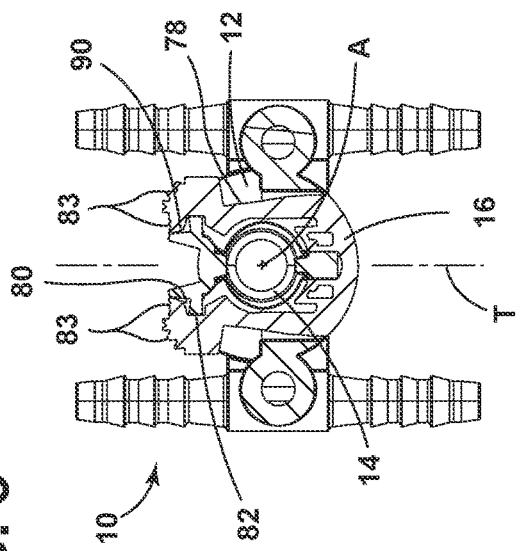
FIG. 5 is a perspective view of the adaptor with the locking member in a connection position, showing the male connector fully inserted into the female connector.
Figure 4:
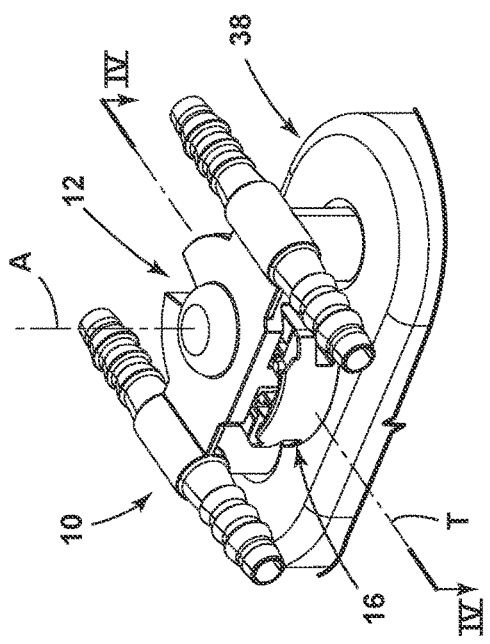
FIG. 4 is a sectional view of the adaptor taken through line IV-IV of FIG. 3.
Figure 6:
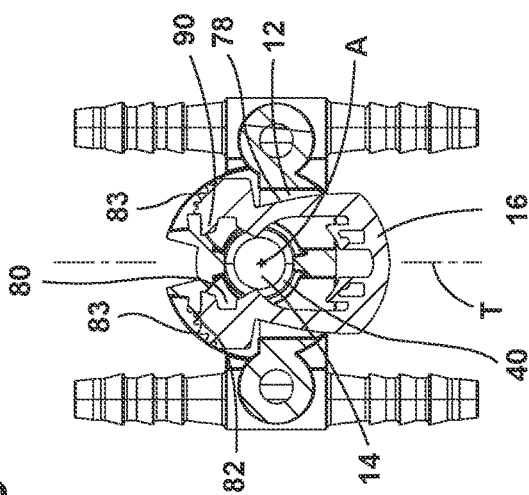
FIG. 6 is a sectional view of the adaptor taken through line VI-VI of FIG. 5.

The locking member 16 is installed through the first or front through holes 58. Initially, the locking member 16 can be installed in an unlocked or pre-connection position as shown in FIGS. 3-4, in which the locking member 16 does not extend through the second or rear through holes 62. The locking member 16 can be moved to a locked or connection position as shown in FIGS. 5-6, in which a portion of the locking member 16 can extend through the rear through holes 62 to provide a visual and tactile proof of connection. Also in the connection position, the web 76 of the locking member 16 can optionally be substantially flush with the adaptor body 26, which can provide a further visual and tactile proof of connection.

Referring to FIGS. 10-11, the locking member 16 can comprise an approximately U-shaped clip. The clip has a web 76 and two resilient prongs 78 spaced apart from each other and connected together at the web 76. The prongs 78 can form runners that can slide on the slides 74 (FIGS. 8-9) in the recess 28 of the female connector 12.

The locking member 16 can include a latch configured to come behind the collar 40 of the male connector 14 in such a manner as to retain it and to lock it in the axial direction A when the male connector 14 is fully pushed into the female connector 12. In one embodiment, the latch comprises a latching hook 80 at a free end of each prong 78. The latching hooks 80 are generally C-shaped or hook-shaped, and can open toward each other in a direction generally orthogonal to the transverse direction T, e.g. towards the inside of the orifice 30 of the female connector 12.

The latching hooks 80 can engage latching catches 82 in the recess 28 of the female connector 12. As shown in FIG. 9, the latching catches 82 can extend axially within the rear through holes 62 of the recess 28. The latching catches 82 may be rectangular in shape and may project generally orthogonally to the transverse direction T, or may have any other shape that can be engaged by corresponding latching hooks 80.

Optionally, the prongs 78 can comprise ribs 83 placed in such a manner that the projection 82 passing over the ribs 83 generates a clicking noise that serves as audible indication that the locking element 16 is reaching the end of its stroke, thereby providing an audible proof of connection. These ribs 83 are also designed to allow the quick connection to be disconnected by hand, without the use of a tool, by a user exerting a traction force sufficient to deform the prongs 78 and move the locking member 16 back into the pre-connection position.

The prongs 78 of the locking member 16 can also be configured so that the locking member 16 moves by itself towards the inside of the female connector 12 in the transverse direction T via a thrust force that is generated by reaction to a radial resilient deformation of the prongs 78 that occurs on pushing the male connector 14 into the female connector 12.

In one embodiment, each prong 78 of the locking member 16 can have a first axially facing face 84 that faces the collar 40 of the male connector 14 when said male connector 14 is inserted in the female connector 12 and an opposing, second axially facing face 85 that faces away from the collar 40. The first axially facing face 84 of each prong 78 can have a ramped surface 88 that, when the locking member 16 is in the pre-connection position (see, e.g., FIGS. 3-4) inside the female connector 12, serves to interfere with the collar 40 of the male connector 14 when the male connector 14 is pushed into the female connector 12. The ramped surface 88 extends slantwise relative to both the axial direction A and transverse direction T when the locking member 16 is inserted into the female connector 12 so as to generate said thrust force pointing in the transverse direction T.

In addition, in accordance with one embodiment, a projection 90 can be provided on each axially facing face 84 of each prong 78, optionally at the top or leading end of the latching hooks 80 as shown in the illustrated example. The projections 90 can project in the axial direction A. In the pre-connection position shown in FIG. 4, the projections 90 are in abutment against the latching catches 82 of the female connector 12, and prevent the locking member 16 from being pushed fully into the recess 28 without the male connector 14 being present in the orifice 30.

A lug 86 can project axially from the second axially-facing face 85 of each prong 78, generally aligned with the middle portion of the C-shaped latching hooks 80. The function of the lugs 86 is explained below.

The lock member 16 can include two stops 92 spaced apart from each other and connected together at the web 76. The stops 92 can extend generally parallel to the prongs 78, and can be spaced therefrom by a gap to form grooves 94 into which the slides 74 of the female connector 12 can be inserted. A cutout part 96 is formed between the stops 92 and allows the first partition 66 of the female connector 12 to be received against the web 76 in the connection position. The stops 92 can have leading ends 98 that are arced, and have roughly the same radius of curvature as the tubular protrusion 36 to receive the male connector 14 in close proximity. The arced leading ends 98 can generally face toward each other, e.g. face the inside of the orifice 30 of the female connector 12.

In FIGS. 3 and 4, the locking member 16 is in the pre-connection position in the female connector 12, and the male connector 14 is partially inserted into the orifice 30 of the female connector 12. The diameter of the collar 40 can be slightly less than the diameter of the orifice 30 of the female connector 12 for insertion of the male connector 14 at least partially into the female connector 12. The prongs 78 of the locking member 16, and in particular the ramped surfaces 88, are in opposition to the collar 40 of the male connector 14. The projection 90 on each prong 78 is in abutment against the latching catch 82 of the female connector 12. The cutout part 96 can partially receive the first partition 66 of the female connector 12 to radially align the locking member 16 within the recess 28 of the female connector 12.

Referring additionally to FIG. 2, the diameter of the collar 40 can be slightly larger than a distance between the ramped surfaces 88 of the locking member 16, and interference with the collar 40 draws the locking member 16 inwardly as the male connector 14 is pushed further into the orifice 30. Initially, the collar 40 exerts axial pressure on the ramped surfaces 88, and the axial thrust force causes the prongs 78 to move radially apart, as indicated by arrows R. Once the prongs 78 move far enough to disengage the projections 90 from the latching catches 82 of the female connector 12, said axial thrust force causes the locking member 16 to translate in direction T farther into the female connector 12. The maximum axial movement is obtained when the lugs 86 on the second axially-facing face 85 of the prongs 78 come into abutment against the inside of the body 26 of the female connector 12.

In FIGS. 5 and 6, the male connector 14 is pushed fully into the orifice 30, and the locking member 16 is in the connection position, where the prongs 78 move resiliently back toward center and the latching catches 82 are engaged by the latching hooks 80. This prevents the locking member 16 from being removed from the female connector 12 by pulling along the transverse direction T.

Once locked, removal of the male connector 14 from the female connector 12 is possible by hand using the ribs 83 to exert a traction force sufficient to deform the prongs 78 and move the locking member 16 back into the pre-connection position while pulling the female connector 12 away from the male connector 14. Disconnection can also be performed by inserting a tool, such as a flathead screwdriver, behind the web 76 to exert a disconnection force sufficient to deform the prongs 78 and move the locking member 16 back into the pre-connection position while pulling the female connector 12 away from the male connector 14.

The exemplary embodiments for the female connector 12 and locking member 16 of the adaptor 10 shown in FIGS. 1-11 serve as examples embodied for describing the present invention without being limited to the scope of the present invention. Other configurations for the female connector 12 and locking member 16 are possible. For example, as described herein with respect to FIGS. 1-11, the locking member 16 can be configured to move by itself in the transverse direction T toward the locked or connection position as the female connector 12 is pushed onto the male connector 14. In another example, the locking member 16 need not move by itself as the female connector 12 is pushed onto the male connector 14, and instead can be manually pushed in the transverse direction T once the male connector 14 is fully received in the female connector 12. Yet another configurations for the quick connect coupling are possible, such as, but not limited to, those described in U.S. Patent Application Publication No. 2017/0146173, published May 25, 2017 and U.S. Patent Application Publication No. 2019/0234547, published Aug. 1, 2019, the complete disclosures of which are incorporated herein by reference. The quick connect coupling may also take on forms different from what is disclosed in the aforementioned references.

Figure 12:
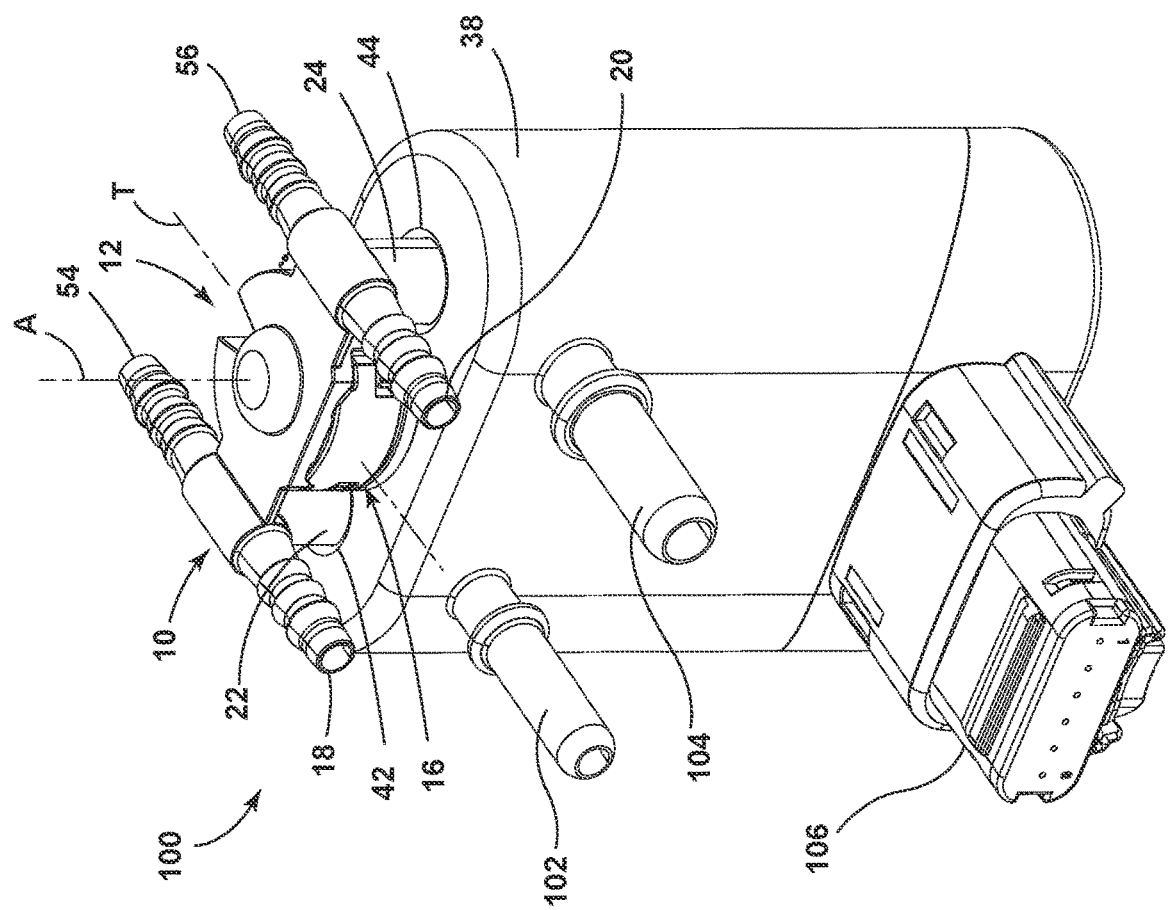
FIG. 12 is a perspective view of an assembly including the adaptor of FIG. 1 and a flow control valve according to another embodiment of the invention.

In FIG. 12, one embodiment of an assembly including the adaptor 10 and the flow control valve 38 is illustrated and generally designated 100. The valve 38 is a dual flow control valve for controlling dual flows of pressurized fluid media. In addition to the valve inlets 42, 44, the valve 38 can further comprise multiple valve outlets 102, 104. The valve 38 can be electronically controlled to selectively allow egress of fluid media through the outlets 102, 104. The valve 38 can be an electronic valve, such as a solenoid valve.

Dual fluid flow pathways extend through the valve 38, from one of the valve inlets 42, 44 to a corresponding on the of the valve outlets 102, 104, respectively. The valve 38 controls the flow of fluid media through the fluid flow pathways, and comprises a separate valve element, such as a solenoid actuator (not shown), in each pathway. A power connector 106 of the valve 38 is connectable to an external current supply to control the solenoid actuators. The open/close status of each valve element can be independently controlled on demand, allowing for fluid media to be supplied individually, simultaneously, or in another desired sequence.

The adaptor 10 can be connected to the valve 38 via the quick connect coupling described previously (i.e., the female and male connectors 12, 14), whereby the valve 38 10 can be quickly connected to the adaptor 10 by hand. Disconnection the valve 38 can be performed with a tool or by hand, as previously described.

Figure 13:
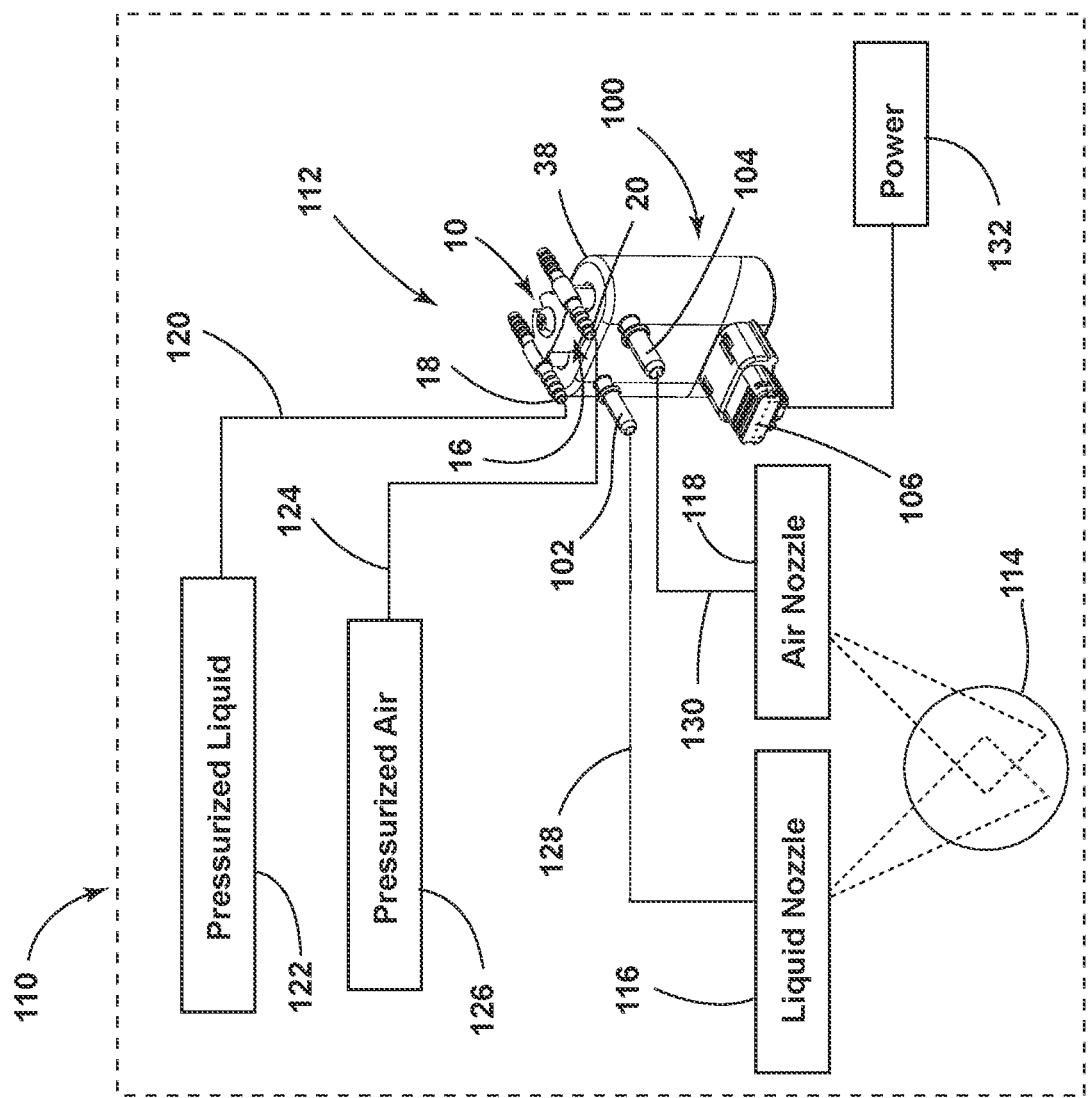
FIG. 13 is a schematic illustration of a vehicle including the assembly of FIG. 12 for cleaning a vehicle surface.

In FIG. 13, a vehicle 110 with a system 112 for cleaning a vehicle surface 114 is schematically illustrated. The system 112 includes the assembly of FIG. 12, including the adaptor 10 and the dual flow control valve 38 for controlling dual flows of pressurized cleaning media to a first nozzle 116 and a second nozzle 118. Optionally, depending on the application, the first cleaning media can comprise a liquid and the second cleaning media can comprise air.

The nozzles 116, 118 are positioned to deliver cleaning media to the same vehicle surface 114. A first flow pathway 120 supplies pressurized cleaning media 122, such as liquid, to the first adaptor inlet 18 and a second flow pathway 124 supplies pressurized cleaning media 126, such as air, to the second adaptor inlet 20. Cleaning media 122, 126 is put under pressure from an external system, e.g. one or more pumps or compressors (not shown).

The nozzles 116, 118 can be remote from the assembly 100, with a first fluid line 128 fluidly connecting the first valve outlet 102 with an inlet of the first nozzle 116 and a second fluid line 130 fluidly connecting the second valve outlet 104 with an inlet of the second nozzle 130. In other embodiments to nozzles 116, 118 can be local to or directly attached with the assembly 100.

The valve 38 is connected to a power supply 132 of the vehicle 110. The open/close status of each valve element of the valve 38 can be independently controlled on demand from a control unit (not shown). The supply of each cleaning media to the assembly 100 can be automated, with cleaning media being supplied automatically predetermined intervals or on an as-needed basis, or can be manual, such as by providing a switch (not shown) in the vehicle cabin that is manually-actuatable by a driver of the vehicle.

The cleaning system 112 can optionally be provided with at least one heating element for heating the cleaning media before it is applied to the vehicle surface 114, and additional conduits, ducts, tubing, hoses, fluid connectors, and/or manifolds (not shown) fluidly coupling components of the system 112 together and providing fluid flow paths from the sources of pressurized cleaning fluid 122, 126 to the assembly 100.

The vehicle surface 114 can comprise a camera, a sensor, a front windshield, a rear windshield, a headlight or headlamp, other another vehicle surface. The assembly 100 can be mounted in various locations on the vehicle 110 to the clean various vehicle surfaces. For example, the assembly 100 can be hood mounted, under hood mounted, cowl screen mounted, or wiper arm mounted. In another example, the assembly 100 can be integrated in or mounted on a rear end spoiler or a center high-mounted stop lamp (CHMSL).

Figure 14:
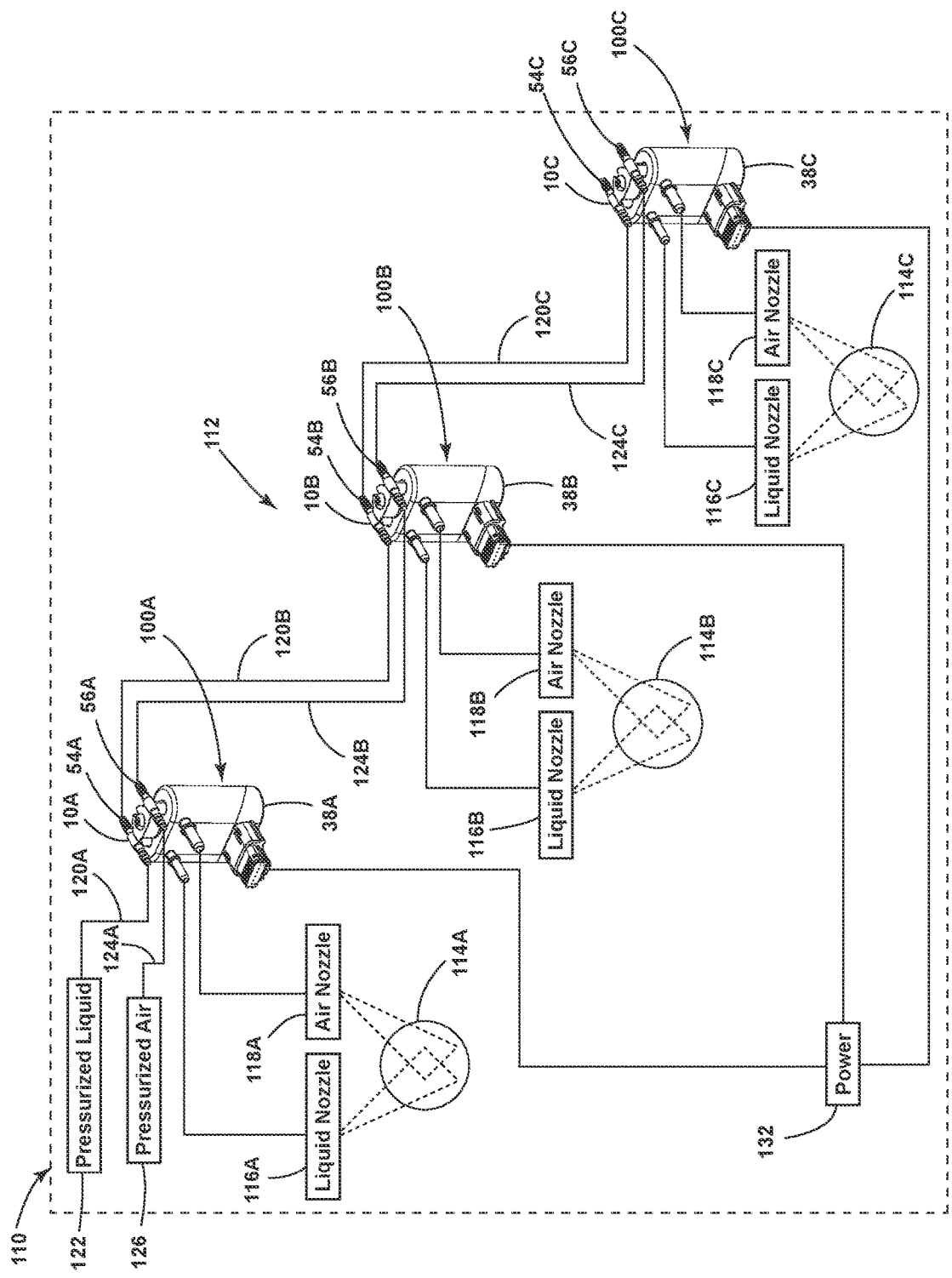
FIG. 14 is a schematic illustration of a vehicle including multiple assemblies of FIG. 12 in a daisy chain system.

As shown in FIG. 14, the vehicle 110 and cleaning system 112 can optionally include multiple assemblies 100A, 100B, 100C in a "daisy chain" fed from the sources of pressurized cleaning media 122, 126. Each assembly 100A, 100B, 100C respectively controls the flow of cleaning media to a different set of nozzles 116A, 118A, 116B, 118B, 116C, 118C, and to a different vehicle surface 114A, 114B, 114C. The bypasses 54A, 56A of the first adaptor 10A can provide cleaning media to the adaptor 10B of the second or downstream assembly 100B via a second set of fluid lines 120B, 124B. The bypasses 54B, 56B of the second adaptor 10B can provide cleaning media to the adaptor 100 of the third or downstream assembly 100C via a third set of fluid lines 120C, 124C.

Figure 15:
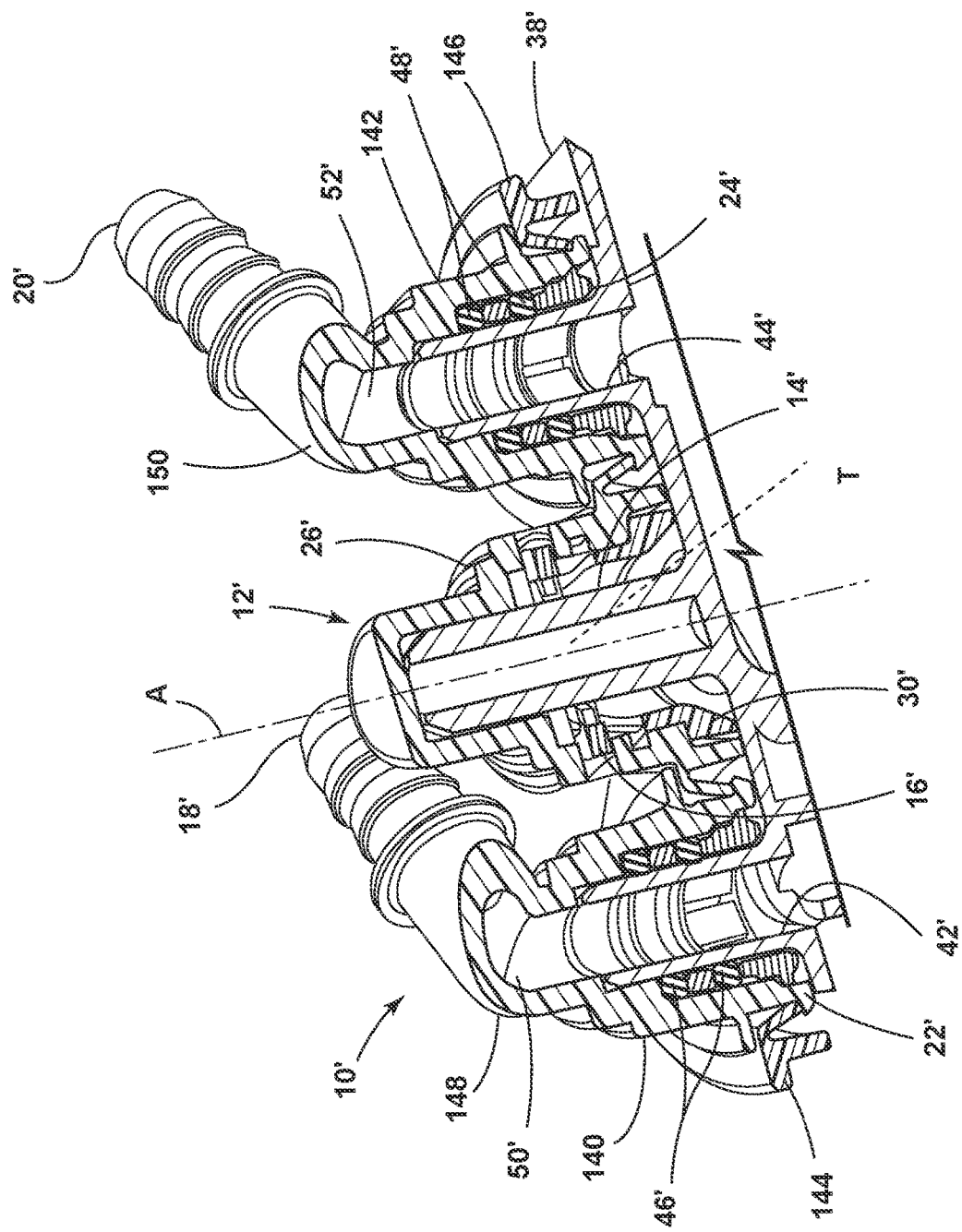
FIG. 15 is a cross-sectional view of an alternate embodiment of an adaptor with a quick connect coupling, and is shown coupled with a flow control valve.
Figure 16:
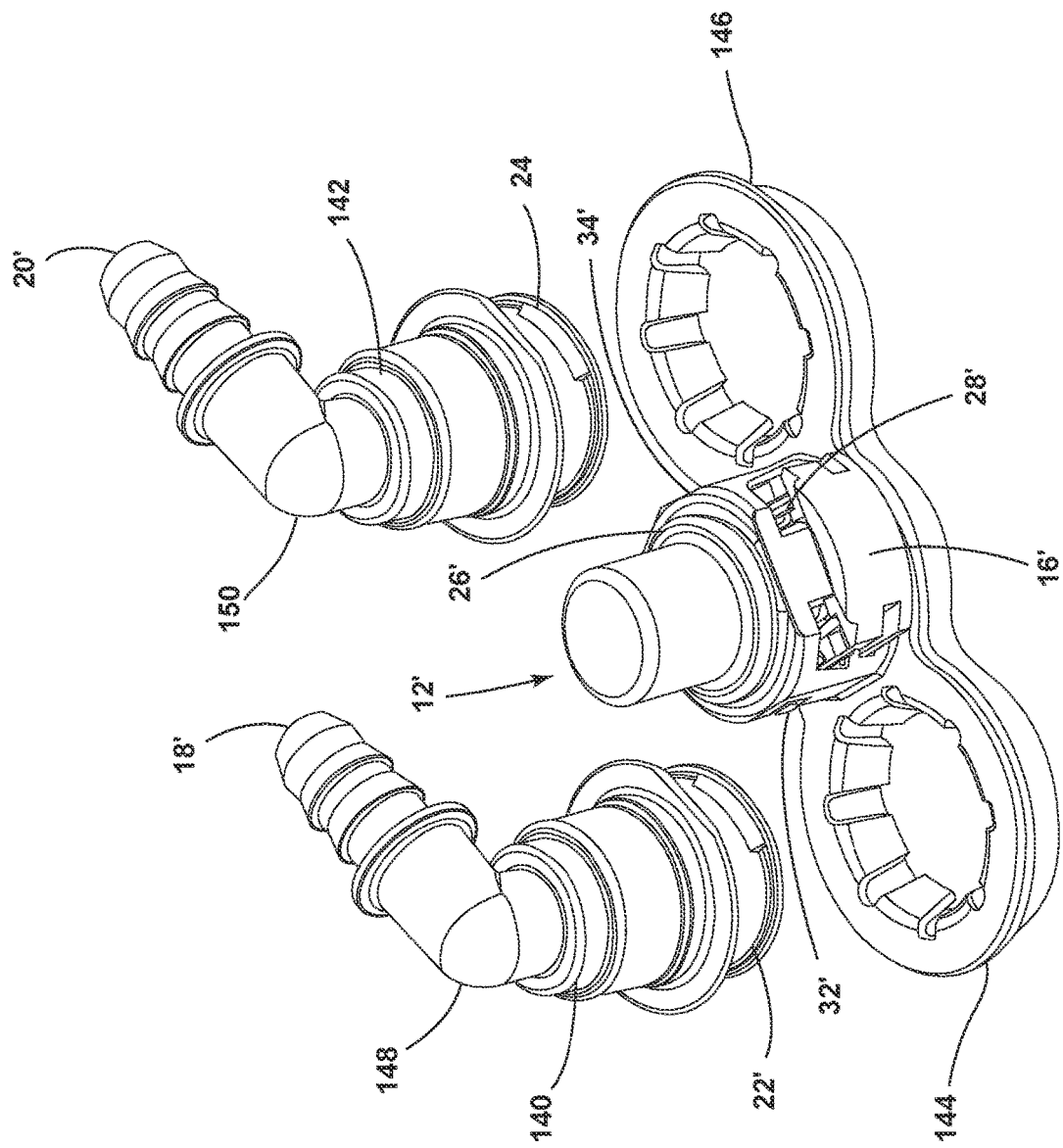
FIG. 16 is an exploded view of the adaptor of FIG. 15.
Figure 17:
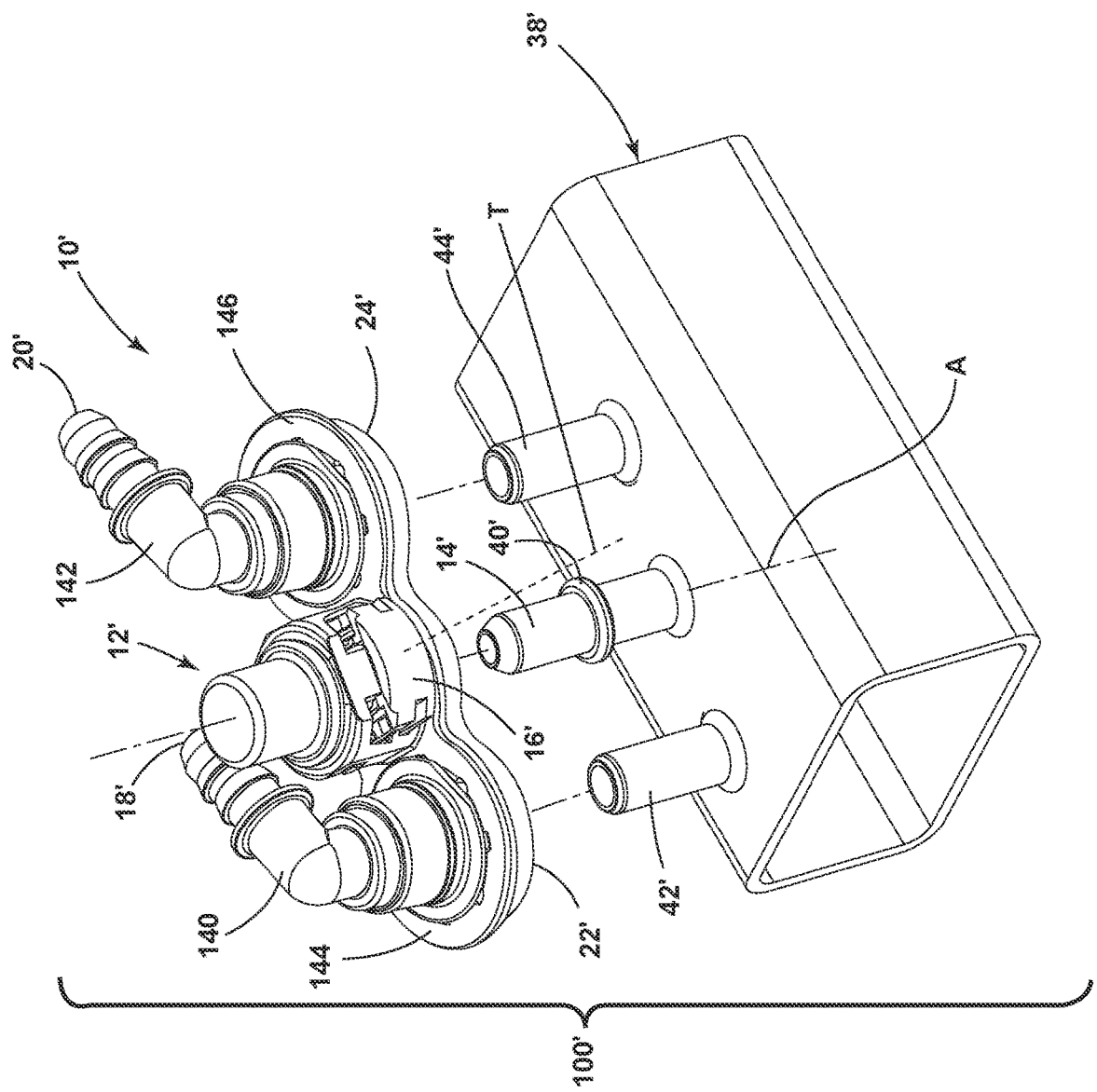
FIG. 17 is an exploded view of an assembly including the adaptor of FIG. 15 and a flow control valve according to another embodiment of the invention.

FIGS. 15-17 show an alternate embodiment of a quick connect adaptor 10' in which like elements are indicated with the same reference numeral bearing a prime (') symbol. Like the first embodiment, the adaptor 10' includes a female connector 12' configured to receive a male connector 14', a locking member 16' slidable in a transverse direction to lock the female and male connectors 12', 14' together and prevent removal of the male connector 14' from the female connector 12', and a plurality of inlets 18', 20' and outlets 22', 24' for the passage of fluid media through the adaptor 10'.

The female connector 12' can have a body 26' defining a recess 28' and an orifice 30' into which the male connector 14' can be inserted along an axial direction A'. The locking member 16' can extend along a transverse direction T' in the recess 28' of the female connector 12'. The locking member 16' and cooperating features of the female connector 12' can be the same as those described above for the first embodiment.

In the illustrated embodiment, the adaptor 10' includes a first tubular body 140 comprising the first adaptor inlet 18' and the first adaptor outlet 22', and a second tubular body 142 comprising the second adaptor inlet 20' and the second adaptor outlet 22'. The tubular bodies 140. 142 are coupled with the body 26' of the female connector 12'.

The tubular bodies 140, 142 can each be a one-piece part manufactured, for example, via molding or an additive manufacturing process, e.g. a 3-D printing process. The female connector 12' can be formed separately, and the tubular bodies are attached to the female connector 12'. The female connector 12' and tubular bodies 140, 142 can be manufactured from plastic material, e.g. by injection molding or additive manufacturing.

The tubular bodies 140, 142 can include the passages 50', 52' fluidly connecting the inlets 18', 20' and their respective outlets 22', 24'. The tubular bodies 140, 142 can include at least one bend 148, 150 to change the flow direction of the fluid media passing from the inlet 18', 20' to the associated outlet 22', 24'. In one embodiment, one or both of the adaptor inlets 18', 20' can be orthogonal to its corresponding adaptor outlet 22', 24'. Accordingly, one or both of the tubular bodies 140, 142 comprises an approximately 90 degrees bend 148, 150. While not shown in the figures, it is understood that the adaptor 10' can comprise bypasses branching off from the passages 50', 52' for conducting fluid media around the adaptor outlets 22', 24'.

A first ring 144 is attached to the body 26' of the female connector 12' and couples the first tubular body 140 with the body 26' of the female connector 12'. A second ring 146 is attached to the body 26' of the female connector 12' and couples the second tubular body 142 with the body 26' of the female connector 12'. It is understood that while rings connected to the adaptor body 26' are shown herein, the tubular bodies 140, 142 can be otherwise attached to the female connector 12'.

The first ring 144 can be disposed on the first side 32' of the body 26' and the second ring 146 cam be disposed on the opposing second side 34' of the body 26'. Optionally, where the adaptor body 26' is generally circular or cylindrical, the first ring 144 can be diametrically opposite the second ring 146.

The first adaptor outlet 22' can be received by the first ring 144 and the second adaptor outlet 24' can be received by the second ring 146. With the tubular bodies 140, 142 comprising bends 148, 150 such that the inlets 18', 20' are non-coaxial (e.g. orthogonal) with its corresponding outlet 22', 24', the orientation of the inlets 18', 20' relative to the female connector 12' can be easily changed depending on the application. For example, FIG. 15 shows the outlets 22', 24' attached to the rings 144, 146 with the inlets 18', 20' at one possible radial position, and it is understood that the outlets 22', 24' can be attached to the rings 144, 146 with the inlets 18', 20' other desired radial positions.

As shown in the figures, the adaptor outlets 22', 24' can comprise female receptacles that receive valve inlets 42', 44', which can comprise male fittings. The adaptor outlets 22', 24' can be configured to accept the valve inlets 42', 44' to establish a fluid connection between sources of fluid media and the valve 38', via the adaptor 10'. The female receptacles 22', 24' can be substantially coplanar with the orifice 30', and the body 26' can abut the valve 38' when the male connector 14' is fully pushed into the female connector 12' (e.g., FIG. 15). In another embodiment, the adaptor outlets 22', 24' can comprise male fittings, with the valve inlets 42', 44' comprising female receptacles.

Sealing elements 46', 48' can be provided at the interfaces between the adaptor outlets 22', 24' and the valve inlets 42', 44' to prevent leakage of fluid media at the interfaces. In illustrative embodiment, the sealing elements 46', 48' are O-rings carried within the adaptor outlets 22', 24'.

In FIG. 17, one embodiment of an assembly including the adaptor 10' and the flow control valve 38' is illustrated and generally designated 100'. The valve 38' is a dual flow control valve for controlling dual flows of pressurized fluid media.

The terms "connected" or "connect" are used herein in their broadest sense to mean and encompass the notions of being formed or integrated with, mounted or attached to, or otherwise joined.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientations.

The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples.

It is to be understood that the appended claims are not limited to express and particular apparatus or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology that has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A quick connect adaptor comprising:
   a female connector having a body defining a recess and an orifice into which a male connector is to be inserted along an axial direction;
   a locking member that extends along a transverse direction in the recess of the female connector and is slidable in the transverse direction to lock the female and male connectors together and prevent removal of the male connector from the female connector;
   a first tubular body comprising:
      a first adaptor inlet configured for fluid communication with a first source of fluid media; and
      a first adaptor outlet in fluid communication with the first adaptor inlet;
   a second tubular body comprising:
      a second adaptor inlet configured for fluid communication with a second source of fluid media; and
      a second adaptor outlet in fluid communication with the second adaptor inlet;
   a first ring attached to one side of the body of the female connector, the first ring mounting the first tubular body to the body of the female connector; and
   a second ring attached to another side of the body of the female connector, the second ring mounting the second tubular body to the body of the female connector;
   wherein the first and second adaptor outlets are orthogonal to the transverse direction.

2. The quick connect adaptor of claim 1, wherein the first adaptor inlet is orthogonal to the first adaptor outlet and the second adaptor inlet is orthogonal to the second adaptor outlet.

3. The quick connect adaptor of claim 1, comprising:
   a first passage between the first adaptor inlet and the first adaptor outlet;
   a first bypass extending from the first passage for conducting fluid media around the first adaptor outlet;
   a second passage between the second adaptor inlet and the second adaptor outlet; and
   a second bypass extending from the second passage for conducting fluid media around the second adaptor outlet.

4. The quick connect adaptor of claim 3, wherein the first bypass is coaxial with the first adaptor inlet and the second bypass is coaxial with the second adaptor inlet.

5. The quick connect adaptor of claim 3, wherein the first bypass is orthogonal with the first adaptor outlet and the second bypass is orthogonal with the second adaptor outlet.

6. The quick connect adaptor of claim 1, wherein the first and second adaptor outlets comprise male fittings, the male fittings adapted to be inserted into female receptacles.

7. The quick connect ad adaptor of claim 1, wherein the first adaptor outlet is received by the first ring and the second adaptor outlet is received by the second ring.

8. The quick connect adaptor of claim 1, wherein the first and second adaptor outlets comprise female receptacles adapted to be receive male fittings inserted along the axial direction.

9. The quick connect adaptor of claim 1, wherein the body of the female connector is cylindrical, and the first ring is attached to the cylindrical body in diametrical opposition to the second ring.

10. The quick connect adaptor of claim 1, wherein the first ring defines a first opening and the second ring defines a second opening, and wherein the first and second openings are outside the body of the female connector.

11. The quick connect adaptor of claim 1, wherein the locking member is disposed between the first ring and the second ring.

12. A quick connect adaptor comprising:
a female connector having a body defining a recess and an orifice into which a male connector is to be inserted along an axial direction;
a locking member that extends along a transverse direction in the recess of the female connector and is slidable in the transverse direction to lock the female and male connectors together and prevent removal of the male connector from the female connector;
a first tubular body comprising:
a first adaptor inlet configured for fluid communication with a first source of fluid media; and
a first adaptor outlet in fluid communication with the first adaptor inlet;
a second tubular body comprising:
a second adaptor inlet configured for fluid communication with a second source of fluid media; and
a second adaptor outlet in fluid communication with the second adaptor inlet;
a first ring attached to one side of the body of the female connector, the first ring mounting the first tubular body to the body of the female connector; and
a second ring attached to another side of the body of the female connector, the second ring mounting the second tubular body to the body of the female connector;
wherein the orifice is non-coaxial with the first adaptor inlet, the second adaptor inlet, the first adaptor outlet, and the second adaptor outlet.

13. The quick connect adaptor of claim 1, wherein the locking member is configured to be deformed resiliently and radially towards the outside of the female connector by mechanically interfering with a collar of the male connector while the male connector is being inserted into the female connector, and, in reaction to this radial resilient deformation, to move by itself in the transverse direction towards the inside of the female connector.

14. An assembly comprising:
a flow control valve comprising a male connector, a first valve inlet disposed on one side of the male connector and a second valve inlet disposed on an opposing side of the male connector; and
a quick connect adaptor comprising:
a female connector having a body defining a recess and an orifice into which a male connector is to be inserted along an axial direction;
a locking member that extends along a transverse direction in the recess of the female connector and is slidable in the transverse direction to lock the female and male connectors together and prevent removal of the male connector from the female connector;
a first adaptor inlet configured for fluid communication with a first source of fluid media;
a second adaptor inlet configured for fluid communication with a second source of fluid media;
a first adaptor outlet in fluid communication with the first adaptor inlet, the first adaptor outlet disposed on one side of the body of the female connector, the first adaptor outlet coupled with the first valve inlet of the flow control valve;
a second adaptor outlet in fluid communication with the second adaptor inlet, the second adaptor outlet disposed on an opposing side of the body of the female connector, the second adaptor outlet coupled with the second valve inlet of the flow control valve;
a first tubular body coupled with the body of the female connector and comprising the first adaptor inlet and the first adaptor outlet; and
a second tubular body coupled with the body of the female connector and comprising the second adaptor inlet and the second adaptor outlet;
a first ring attached to the body of the female connector on the one side thereof, the first ring coupling the first tubular body with the body of the female connector; and
a second ring attached to the body of the female connector on an opposing side thereof, the second ring coupling the second tubular body with the body of the female connector.

\* \* \* \* \*